United States Patent
Lee et al.

(10) Patent No.: US 8,380,006 B2
(45) Date of Patent: Feb. 19, 2013

(54) SYSTEM AND METHOD FOR MERGING SEPARATED PIXEL BLOCKS INTO AN INTEGRAL IMAGE OF AN OBJECT

(75) Inventors: Chung-I Lee, Taipei Hsien (TW); Chien-Fa Yeh, Taipei Hsien (TW); Chiu-Hua Lu, Taipei Hsien (TW); Cheng-Feng Tsai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 707 days.

(21) Appl. No.: 12/605,435

(22) Filed: Oct. 26, 2009

(65) Prior Publication Data

US 2010/0329587 A1    Dec. 30, 2010

(30) Foreign Application Priority Data

Jun. 26, 2009  (CN) .......................... 2009 1 0303766

(51) Int. Cl.
*G06K 9/34*  (2006.01)
*G06K 9/36*  (2006.01)

(52) U.S. Cl. ...................................... 382/284; 382/173
(58) Field of Classification Search .................. 382/284
See application file for complete search history.

(56) References Cited

U.S. PATENT DOCUMENTS

| | | | | | |
|---|---|---|---|---|---|
| 5,966,455 | A | * | 10/1999 | Saito | 382/112 |
| 2003/0215135 | A1 | * | 11/2003 | Caron et al. | 382/173 |
| 2004/0076999 | A1 | * | 4/2004 | Faeldt et al. | 435/6 |
| 2004/0080670 | A1 | * | 4/2004 | Cheatle | 348/441 |
| 2005/0111745 | A1 | * | 5/2005 | Kato et al. | 382/243 |
| 2006/0228044 | A1 | * | 10/2006 | Yeh et al. | 382/276 |

* cited by examiner

*Primary Examiner* — Michelle Entezari
(74) *Attorney, Agent, or Firm* — Altis Law Group, Inc.

(57) ABSTRACT

A method for merging separated pixel blocks into an integral image of an object is provided. The method performs binary image processing on an obtained image to obtain a binary image, finds pixel blocks in the binary image whose area is greater than a first preset value, and stores a position and a size of each found pixel block in a data structure. The method further merges two pixel blocks in the data structure if a distance between the two pixel blocks is less than a second preset value, so as to generate the integral image of the object.

16 Claims, 5 Drawing Sheets

SYSTEM AND METHOD FOR MERGING SEPARATED PIXEL BLOCKS INTO AN INTEGRAL IMAGE OF AN OBJECT

BACKGROUND

1. Technical Field

Embodiments of the present disclosure relate to image processing technology, and particularly to a system and method for merging separated pixel blocks into an integral image of an object.

2. Description of Related Art

Noise may be filtered from an image using a number of known methods. One method filters pixels in the image whose difference value of red, green, and blue (RGB) is less than a preset value. Another method sharpens the image firstly, then, filters the pixels in the sharpened image whose difference value of RGB is less than the preset value. However, the above-mentioned two methods may divide an object in the image into a plurality of separated pixel blocks. Therefore, prompt and accurate method of merging the separated pixel blocks into an integral image is desired.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
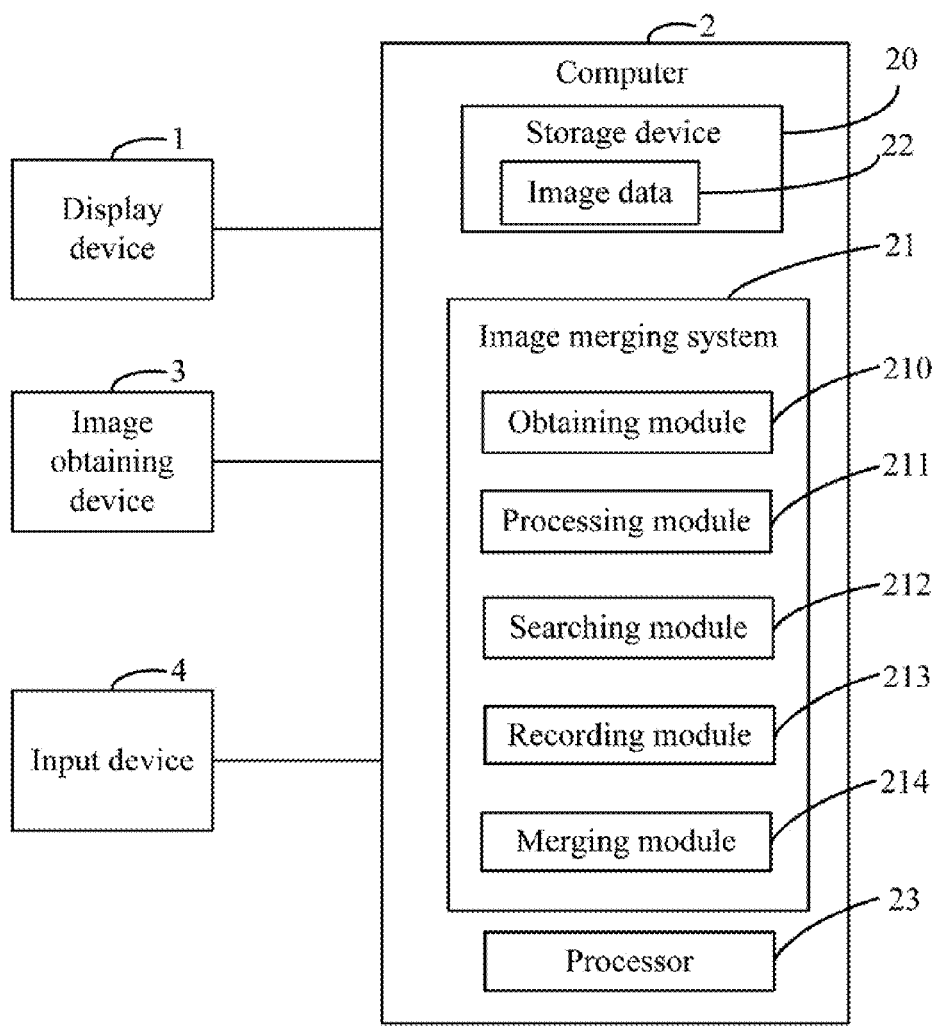
FIG. 1 is a block diagram of one embodiment of a computer comprising an image merging system for merging separated pixel blocks into an integral image of an object.

FIG. 1 is a block diagram of one embodiment of a computer 2 comprising an image merging system 21. In one embodiment, the image merging system 21 may be used to merge separated pixel blocks into an integral image of an object. A detailed description will be given in the following paragraphs.

In one embodiment, the computer 2 is electronically connected to a display device 1, an image obtaining device 3, and an input device 4. Depending on the embodiment, the display device 1 may be a liquid crystal display (LCD) or a cathode ray tube (CRT) display, for example.

The computer 2 further includes a storage device 20 for storing information, such as image data 22 captured by the image obtaining device 3. In one embodiment, the image obtaining device 3 may be an Internet Protocol (IP) camera.

The input device 4 is provided for manually editing an image displayed on the display device 1. In one embodiment, the input device 4 may be a keyboard.

In one embodiment, the image merging system 21 includes an obtaining module 210, a processing module 211, a searching module 212, a recording module 213, and a merging module 214. In one embodiment, the modules 210-214 comprise one or more computerized instructions that are stored in the storage device 20. A processor 23 of the computer 2 executes the computerized instructions to implement one or more operations of the computer 2.

The obtaining module 210 obtains an image from the storage device 20.

The processing module 211 performs binary image processing on the obtained image to obtain a binary image. It may be understood that the binary image has only two possible values for each pixel in the binary image. Usually, two colors used for the binary image are black and white, although any two colors can be used. In one embodiment, the color used for the object in the image is the foreground color (such as black), while the rest of the image is the background color (such as white).

The searching module 212 finds each pixel block in the binary image whose area is greater than a first preset value. In one embodiment, the pixel block refers to an array of one or more pixels connected together, and the first preset value is one hundred pixels. For example, if the background color of the binary image is white, the searching module 212 finds each black pixel block in the binary image whose area is greater than the first preset value. If the background color of the binary image is black, the searching module 212 finds each white pixel block in the binary image whose area is greater than the first preset value.

The searching module 212 determines if such a pixel block whose area is greater than the first preset value has been found.

The recording module 213 records a position and a size of each found pixel block, and stores the position and the size of each found pixel block in a data structure (e.g., an array). In one embodiment, a position of each found pixel block refers to coordinates of a center point of the found pixel block.

Figure 3A:
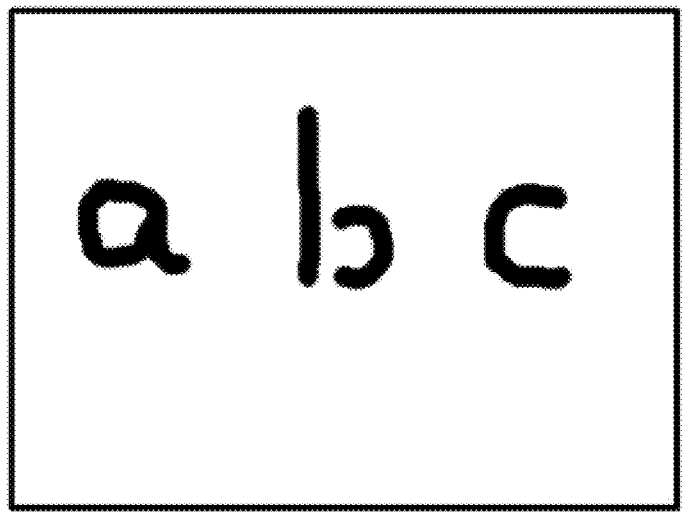
FIGS. 3A-3C are one embodiment of merged pixel blocks used to generate an integral image of an object.
Figure 3B:
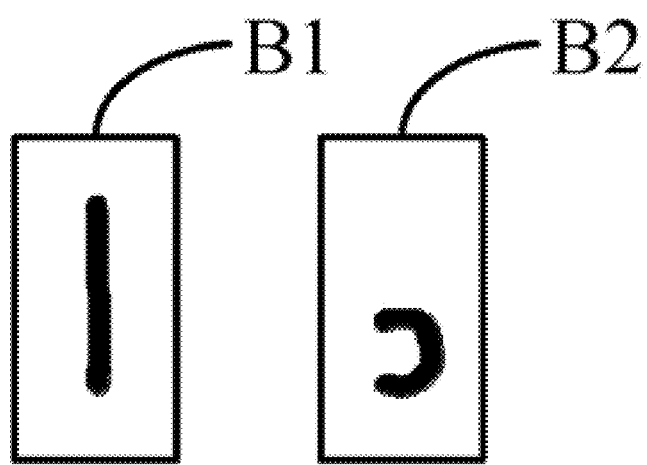
Figure 3C:
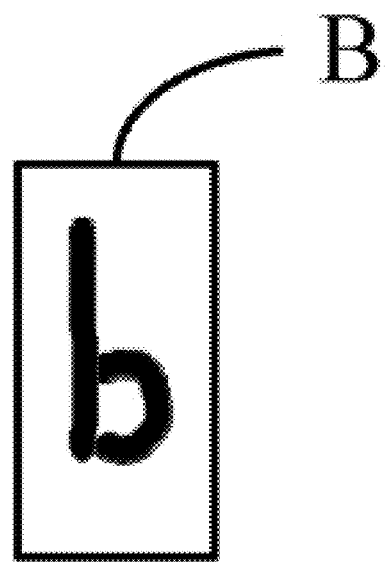

The merging module 214 calculates a distance between every two pixel blocks in the data structure in sequence, and merges the two pixel blocks if the distance between the two pixel blocks is less than a second preset value, so as to generate the integral image of the object. In one embodiment, the second preset value is a length of ten pixels. An example of merging two separated pixel blocks to generate an integral image of an object is shown in FIGS. 3A-3C. FIG. 3A represents a binary image, FIG. 3B represent two separated pixel blocks (i.e., blocks "B1" and "B2") of a character "b" in FIG. 3A, and FIG. 3C represents a merged integral character "b" (i.e., a block "B").

For the purpose of illustration, supposing the positions of the found pixel blocks are stored in an array P having elements of P[0], P[1], P[2], P[3], P[4], . . . P[n], the merging module 214 calculates a distance between P[0] and each other element in sequence. That is to say, the merging module 214 calculates distances between P[0] and P[1], P[0] and P[3], . . . , P[0] and P[n], so as to find two pixel blocks whose distance is less than the second preset value. For example, if a distance between P[0] and P[1] is greater than or equal to the second preset value, the merging module 214 further calculates a distance between P[0] and P[2]. If the distance between P[0] and P[2] is less than the second preset value, the merging module 214 merges the two pixels blocks corresponding to P[0] and P[2], and further finds another two pixel blocks whose distance is less than the second preset value, and performs the merging operation till all the elements are determined.

In other embodiment, the obtaining module 210 further sharpens the obtained image when the image is obtained from the storage device 20.

Figure 2:
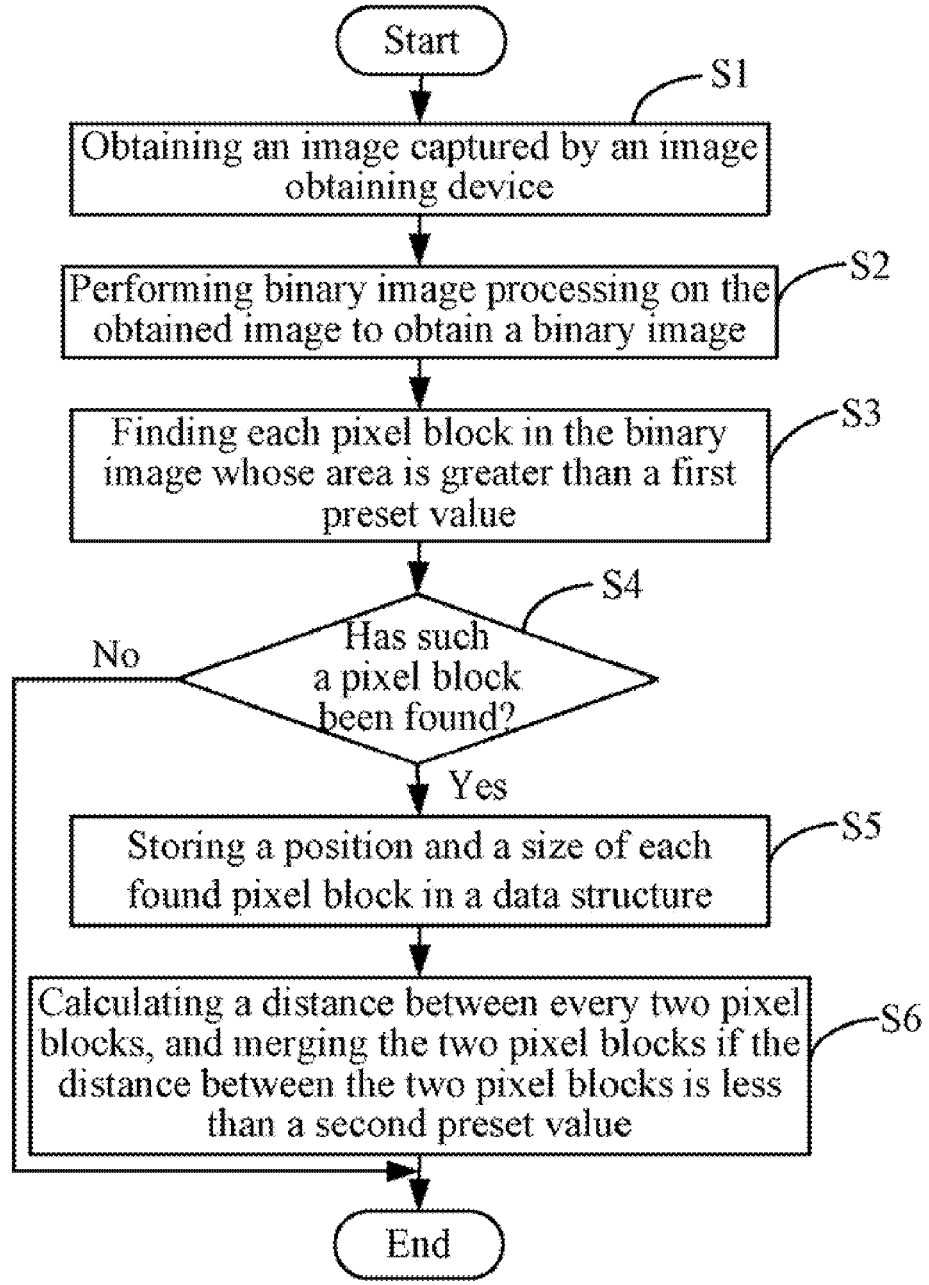
FIG. 2 is a flowchart of one embodiment of a method for merging separated pixel blocks into an integral image of an object.

FIG. 2 is a flowchart of one embodiment of a method for merging separated pixel blocks into an integral image of an object. Depending on the embodiment, additional blocks may be added, others removed, and the ordering of the blocks may be changed.

In block S1, the obtaining module 210 obtains an image from the storage device 20.

In block S2, the processing module 211 performs binary image processing on the obtained image to obtain a binary image.

In block S3, the searching module 212 finds each pixel block in the binary image whose area is greater than a first preset value. In one embodiment, the pixel block refers to an array of one or more pixels connected together.

In block S4, the searching module 212 determines if such a pixel block whose area is greater than the first preset value has been found, and the procedure goes to block S5 if such a pixel block has been found in block S3, or the procedure ends if any one pixel block has not found in block S3.

In block S5, the recording module 213 records a position and a size of each found pixel block, and stores the position and the size of each found pixel block in a data structure. In one embodiment, a position of each found pixel block refers to coordinates of a center point of the found pixel block.

In block S6, the merging module 214 calculates a distance between every two pixel blocks in the data structure in sequence, and merges the two pixel blocks if the distance between the two pixel blocks is less than a second preset value, so as to generate the integral image of the object.

In other embodiment, the method further includes a followed block: the obtaining module 210 sharpens the obtained image when the image is obtained from the storage device 20.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for merging separated pixel blocks into an integral image of an object, the method comprising:
   obtaining an image captured by an image obtaining device from a storage device;
   performing binary image processing on the obtained image to obtain a binary image;
   finding each pixel block in the binary image whose area is greater than a first preset value;
   recording a position and a size of each found pixel block, and storing the position and the size of each found pixel block in a data structure; and
   calculating a distance between every two pixel blocks in the data structure in sequence, and merging the two pixel blocks upon the condition that the distance between the two pixel blocks is less than a second preset value, so as to generate the integral image of the object.

2. The method according to claim 1, wherein the pixel block refers to an array of one or more pixels connected together.

3. The method according to claim 1, wherein finding each pixel block in the binary image whose area is greater than a first preset value comprises:
   finding each black pixel block in the binary image whose area is greater than the first preset value, upon the condition that a background color of the binary image is white; and
   finding each white pixel block in the binary image whose area is greater than the first preset value, upon the condition that a background color of the binary image is black.

4. The method according to claim 1, wherein a position of each found pixel block refers to coordinates of a center point of the found pixel block.

5. The method according to claim 1, wherein the data structure is an array or a queue.

6. A non-transitory storage medium having stored thereon instructions that, when executed by a processor of a computer, cause the processor to perform a method for merging separated pixel blocks into an integral image of an object, the method comprising:
   obtaining an image captured by an image obtaining device from a storage device;
   performing binary image processing on the obtained image to obtain a binary image;
   finding each pixel block in the binary image whose area is greater than a first preset value;
   recording a position and a size of each found pixel block, and storing the position and the size of each found pixel block in a data structure; and
   calculating a distance between every two pixel blocks in the data structure in sequence, and merging the two pixel blocks upon the condition that the distance between the two pixel blocks is less than a second preset value, so as to generate the integral image of the object.

7. The non-transitory storage medium according to claim 6, wherein the pixel block refers to an array of one or more pixels connected together.

8. The non-transitory storage medium according to claim 6, wherein finding each pixel block in the binary image whose area is greater than a first preset value comprises:
   finding each black pixel block in the binary image whose area is greater than the first preset value, upon the condition that a background color of the binary image is white; and
   finding each white pixel block in the binary image whose area is greater than the first preset value, upon the condition that a background color of the binary image is black.

9. The non-transitory storage medium according to claim 6, wherein a position of each found pixel block refers to coordinates of a center point of the found pixel block.

10. The non-transitory storage medium according to claim 6, wherein the data structure is an array or a queue.

11. The non-transitory storage medium according to claim 6, wherein the medium is selected from the group consisting of a hard disk drive, a compact disc, a digital video disc, and a tape drive.

12. A computing system for merging separated pixel blocks into an integral image of an object, comprising:
   a storage device for storing images captured by an image obtaining device;
   an obtaining module operable to obtain an image from the storage device;
   a processing module operable to perform binary image processing on the obtained image to obtain a binary image;
   a searching module operable to find each pixel block in the binary image whose area is greater than a first preset value;

the searching module further operable to determine if such a pixel block is found;

a recording module operable to record a position and a size of each found pixel block, and store the position and the size of each found pixel block in a data structure; and a merging module operable to calculate a distance between every two pixel blocks in the data structure in sequence, and merge the two pixel blocks upon the condition that the distance between the two pixel blocks is less than a second preset value, so as to generate the integral image of the object.

13. The system according to claim 12, wherein the pixel block refers to an array of one or more pixels connected together.

14. The system according to claim 12, wherein the searching module finds each pixel block in the binary image whose area is greater than a first preset value by:

finding each black pixel block in the binary image whose area is greater than the first preset value, upon the condition that a background color of the binary image is white; and finding each white pixel block in the binary image whose area is greater than the first preset value, upon the condition that a background color of the binary image is black.

15. The system according to claim 12, wherein a position of each found pixel block refers to coordinates of a center point of the found pixel block.

16. The system according to claim 12, wherein the data structure is an array or a queue.

* * * * *